(12) United States Patent
Khan

(10) Patent No.: US 11,513,986 B1
(45) Date of Patent: Nov. 29, 2022

(54) DMA ENGINE THAT GENERATES AN ADDRESS-LESS MEMORY DESCRIPTOR THAT DOES NOT INCLUDE A MEMORY ADDRESS FOR COMMUNICATING WITH INTEGRATED CIRCUIT DEVICE

(71) Applicant: Amazon Technologies, Inc., Seattle, WA (US)

(72) Inventor: Asif Khan, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/983,131

(22) Filed: Aug. 3, 2020

(51) Int. Cl.
 *G06F 13/28* (2006.01)
 *G06F 12/06* (2006.01)
(52) U.S. Cl.
 CPC .......... *G06F 13/28* (2013.01); *G06F 12/0646* (2013.01); *G06F 2212/1008* (2013.01)
(58) Field of Classification Search
 CPC ................. G06F 13/28; G06F 12/0646; G06F 2212/1008
 See application file for complete search history.

(56) References Cited

U.S. PATENT DOCUMENTS

| | | | |
|---|---|---|---|
| 10,146,468 B2 * | 12/2018 | Mirza ................... | G06F 3/0683 |
| 11,003,606 B2 * | 5/2021 | Birsan .................... | G06F 13/28 |
| 2014/0215103 A1 * | 7/2014 | Cohen ..................... | G06F 13/28 |
| | | | 710/23 |

\* cited by examiner

*Primary Examiner* — Tammara R Peyton
(74) *Attorney, Agent, or Firm* — Weaver Austin Villeneuve & Sampson LLP

(57) ABSTRACT

To improve data throughput and data transfer rate, a contiguous block of host memory can be allocated for data transfers between the host system and an integrated circuit device such as a peripheral component. By using a contiguous block of memory that acts as a circular buffer, the memory address field of memory descriptors can be eliminated because the host system only need to inform the data movement engine of the length of each data transfer. The data movement engine can maintain pointers to keep track of the memory address in the host memory to read from and write to. After each data transfer, the relevant pointer can be incremented by a value corresponding to the length indicated in the memory descriptor for the transfer. As such, it is not necessary for the host system to provide the data movement engine with the memory address of each transfer.

26 Claims, 14 Drawing Sheets

DMA ENGINE THAT GENERATES AN ADDRESS-LESS MEMORY DESCRIPTOR THAT DOES NOT INCLUDE A MEMORY ADDRESS FOR COMMUNICATING WITH INTEGRATED CIRCUIT DEVICE

BACKGROUND

A host computing system can be equipped with different types of peripheral components to enhance the functionality of the host system. The peripheral components can be in the form of add-in cards, and may implement various functionalities such as networking, encryption, graphics processing, etc. The peripheral components can be implemented using integrated circuit devices such as application-specific integrated circuits, programmable logic devices, and the like. In a cloud-computing environment, a peripheral component implemented using a programmable logic device such as a field programmable gate array (FPGA) can allow a client to implement custom logic to perform specialized tasks on the host system.

BRIEF DESCRIPTION OF THE DRAWINGS

Various embodiments in accordance with the present disclosure will be described with reference to the drawings, in which.

DETAILED DESCRIPTION

Figure 1:
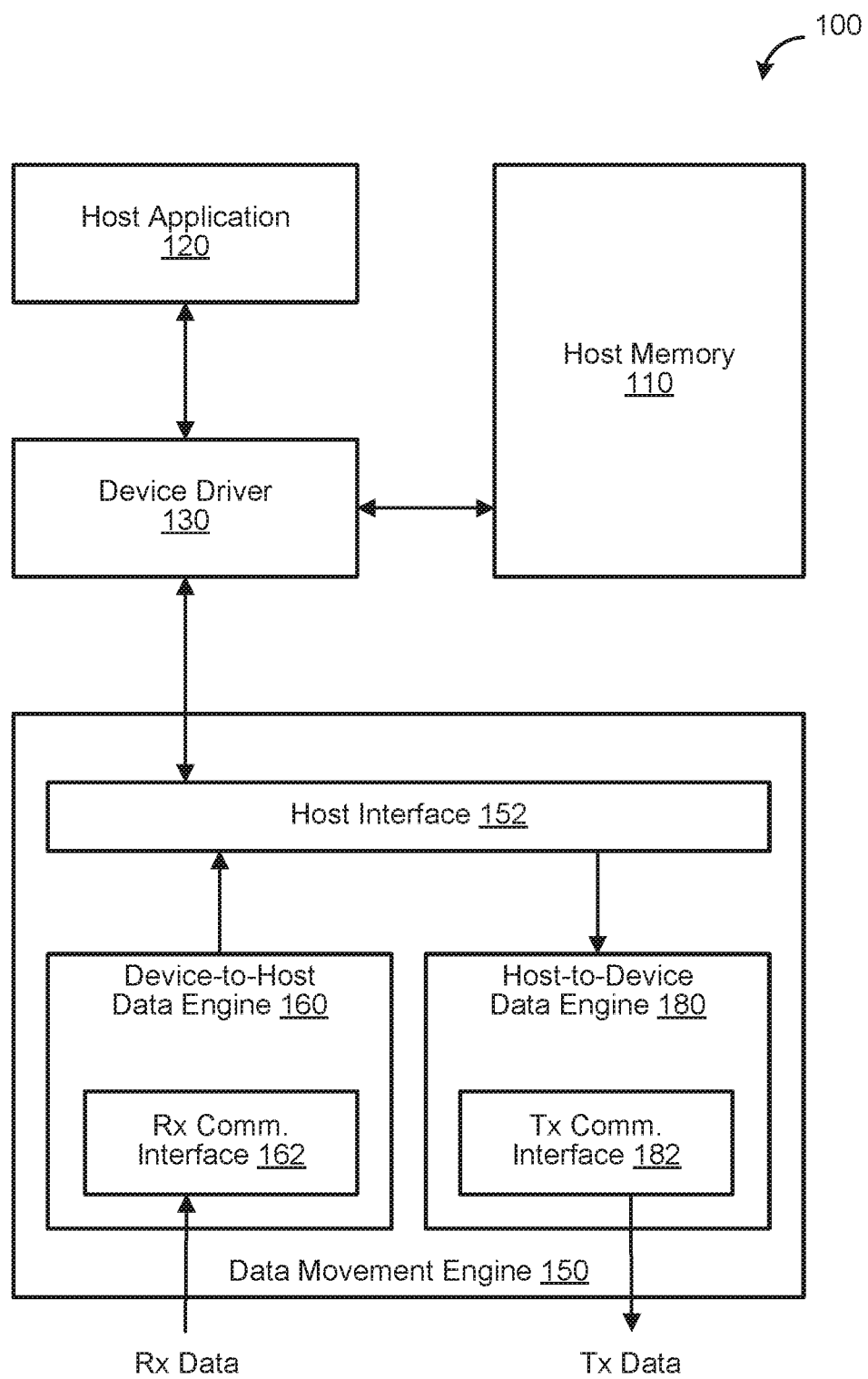
FIG. 1 illustrates a high level block diagram of an example of a host computing system, according to certain aspects of the disclosure.

Direct memory access (DMA) is an example of a data movement technique that allows a peripheral component to bypass a host processor to exchange data with the host memory of a host system. To facilitate the DMA transfers, a data movement engine such as a DMA engine is provided with memory descriptors to indicate the memory locations in the host memory that the peripheral component should write to or read from. The memory locations can be selected on the fly by the host system, which may use a paging technique to allocate relatively small memory pages (e.g., 4 Kbytes) to facilitate the memory transfer. Such paging techniques can result in random and non-contiguous locations in the host memory being used for the DMA transfers. Each memory descriptor may include a memory address and a length indicating the number of bytes of the data transfer. Although DMA can provide low latency data transfers, the amount of communications used to provide the memory descriptors to the data movement engine can create a bottleneck to limit the data throughput and data transfer rate.

To improve data throughput and reduce the amount of communications needed to provide the memory descriptors to the data movement engine, a contiguous block of host memory can be allocated for the data transfers in each direction. The contiguous block of memory can be relatively large such that the block of memory can store multiple data packets of the maximum size for the particular application. For example, in networking applications, Ethernet packets can have a maximum length in the order of 1500 bytes, and the size of the contiguous block of memory can be chosen to be several times (e.g., 5×, 10×, etc.) this maximum packet length. As another example, in applications that support jumbo frames, the maximum packet length can be in the order of 10 Kbytes, and the size of the contiguous block of memory can be chosen to be several times this maximum packet length By using a host-to-device contiguous block of memory that acts as a circular buffer in the host-to-device direction, the memory address field of the memory descriptor can be eliminated because the host system only need to inform the data movement engine of the length of each data transfer, according to some implementations. The data movement engine can maintain a host-to-device read pointer to keep track of the physical memory address in the host memory to read from. After each DMA transfer in the host-to-device direction, the data movement engine can increment the host-to-device read pointer by the length indicated in the memory descriptor for the transfer. As such, it is not necessary for the host system to provide the data movement engine with the memory address of each transfer.

In the device-to-host direction, the memory descriptors for the data movement engine can be eliminated altogether. The data movement engine can maintain a device-to-host write pointer to indicate the location in the host memory to write to. As data is being written to the device-to-host contiguous block of memory, the data movement engine can increment the device-to-host write pointer by the amount of data being written, such that the device-to-host write pointer is updated to point to the next available physical memory address in the device-to-host contiguous block of memory.

By eliminating the address field in the host-to-device memory descriptors and eliminating the device-to-host memory descriptors altogether, the amount of communications used to transfer the memory descriptors can be reduced. As a result, in the host-to-device direction, the host system can provide more host-to-device memory descriptors to the data movement engine in a given period of time to improve data throughput and packet transfer rate. In the device-to-host direction, the data movement engine can write data to the host memory without the extra overhead of obtaining the device-to-host memory descriptors.

To reduce the complexity of the data movement engine, the data associated with each data transfer can be stored in the memory such that the data is aligned with a natural boundary of the memory interface (e.g., data transfer bus width of the data movement engine, word length of the memory, etc.). This would allow the address field of the memory descriptors to be aligned with the natural boundary as well. For example, if the data transfer bus width is 16 bytes, the data associated with each data transfer can be aligned to the 16-byte boundary, and pointers used to access the data can be incremented in 16-byte increments. Thus, if the data movement engine is transferring packets that are 30 bytes long, each packet will occupy two 16-byte memory locations such that the beginning of each packet starts on a 16-byte boundary. Aligning the data transfers in such a manner can remove the logic and complexity needed to calculate offsets from the natural boundary indicating where each data packet begins.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a block diagram of an example of a host system 100, according to some implementations. Host system 100 may include a host application 120, a device driver 130, host memory 110, and a data movement engine 150. Host application 120 and device driver 130 are software programs executed by host processing logic (not shown). The host processing logic may include one or more processors, microprocessors, acceleration engines, field-programmable gate arrays (FPGAs), and/or other suitable processing logic components. The processors can be general purpose computing devices such as those manufactured by Intel®, AMD® ARM®, Qualcomm®, and others. The processors are generally capable of executing software code, and one or more of the processors may include multiple processing cores. Host application 120 is a software program being executed on host system 100 to perform certain computing tasks. Host application 120 can be a client or non-privileged program, or can be a system or privileged program. In some implementations, host application 120 can be a software application under development that is being developed and tested on host system 100 by a client user.

Device driver 130 is a software program that is used to interface and control a hardware component of host system 100. In some implementations, device driver 130 can be a poll-mode driver running in the user space. Device driver 130 can interface with data movement engine 150 to exchange data between a peripheral component and host application 120. For example, device driver 130 can be configured to allocate portions of host memory 110 to be used by host application 120 to exchange data with the peripheral component. Device driver 130 can service requests from host application 120 to transfer data to the peripheral component by writing the data into host memory 120, and can provide data from the peripheral component to host application 120 by fetching data from host memory 110 written by the peripheral component.

Although both host application 120 and device driver 130 are shown to be separate from host memory 110, either or both of these software components can be stored in host memory 110. Either or both of these software components can also be stored in a separate storage such as a hard disk or solid-state drive of host system 100.

Host memory 110 may provide temporary or long-term storage for data that may be accessed by host application 120 and/or host system 100. Host memory 110 may include dynamic random access memory (DRAM) (e.g., synchronous DRAM (SDRAM) including double data rate (DDR), among others), static random access memory (SRAM), flash memory, cross-point memory, or any combinations thereof. In some implementations, host memory 110 may also include read-only memory (ROM) such as programmable read-only memory (PROM), erasable programmable read-only memory (EPROM), electrically erasable programmable read-only memory (EEPROM), and/or flash EEPROM, among others.

Data movement engine 150 may include logic and circuitry to implement DMA data transfers between a peripheral component and host memory 110. The DMA transfers can be used to provide host application 120 with data from the peripheral component, and/or to provide the peripheral component with data from host application 120. Data movement engine 150 can be implemented as part of the peripheral component or be coupled to the peripheral component. The peripheral component can be, for example, a network interface card, an acceleration engine such as a cryptographic engine or graphics engine, or a client configurable hardware component to implement custom logic for a user. Data movement engine 150 and/or the peripheral component can be implemented as an integrated circuit device using an application-specific integrated circuit, programmable logic device such as field programmable gate array (FPGA), or a combination thereof. In some implementations, the integrated circuit device can be coupled to the host system via an interface such as a peripheral bus, or can be integrated on the same printed circuit board such as a motherboard of the host system.

Data movement engine 150 may include a host interface 152 and two communication channels for data transfer—one channel for transferring data in the device-to-host direction, and one channel for transferring data in the host-to-device direction. The host interface 152 can be implemented using a Peripheral Component Interconnect (PCI) bus protocols such as the original PCI, PCI-eXtended (PCI-X), PCI Express (PCIe), or other PCI derivative bus protocols. Host interface 152 can also be implemented using other types of standard bus protocols, proprietary bus protocols, or a combination thereof. The device-to-host channel may include a device-to-host data engine 160 that is responsible for moving data received from the peripheral component on communication interface 162 to host memory 110 via host interface 152. The host-to-device channel may include a host-to-device data engine 180 that is responsible for moving data read from host memory 110 on host interface 152 to the peripheral component via communication interface 182. Communication interfaces 162 and 182 can be implemented using an interconnect interface such as Advanced eXtensible Interface (AXI) or other suitable communication interface. In some implementations, communication interfaces 162 and 182 can be implemented as streaming interfaces such that data movement engine 150 provides packet streaming connectivity between the peripheral component and host application 120. In such implementations, data movement engine 150 can be referred to as a streaming data engine.

Figure 2:
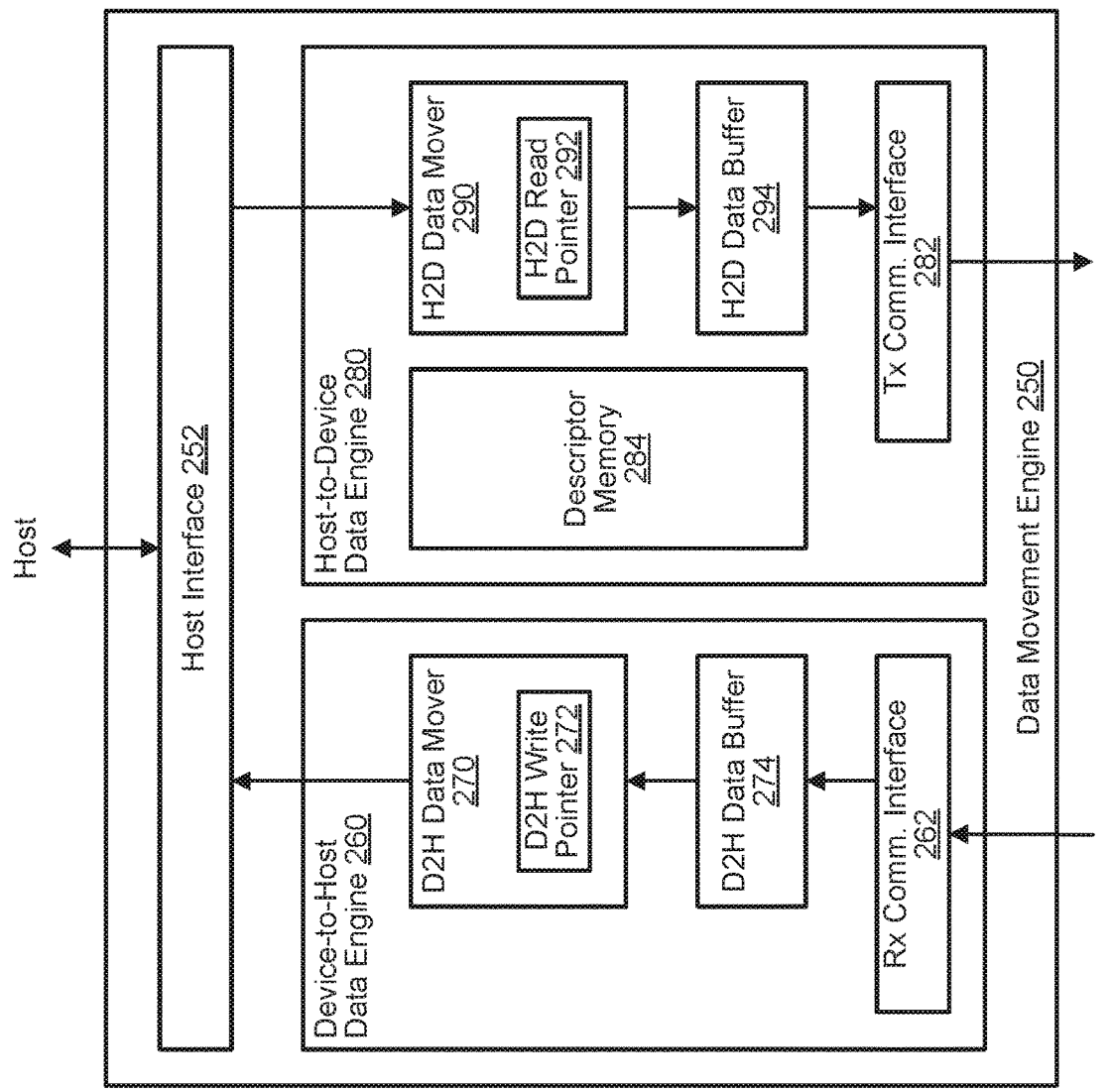
FIG. 2 illustrates a block diagram of an example of a data movement engine, according to certain aspects of the disclosure.

FIG. 2 illustrates a more detailed block diagram of an example of a data movement engine 250, according to some implementations. data movement engine 250 may include components similar to those described above including host interface 252, device-to-host data engine 260 having a communication interface 262, and host-to-device data engine 280 having a communication interface 282. Host-to-device data engine 280 may further include a host-to-device data mover 290, a host-to-device data buffer 294, and a descriptor memory 284. Descriptor memory 284 can be implemented as a circular buffer or ring queue, and is configured to store a set of address-less memory descriptors that is used by host-to-device data mover 290 to fetch data from the host memory. When data is available in the host memory for transfer from a host application to the peripheral component, the device driver may write an address-less memory descriptor into descriptor memory 284.

The address-less memory descriptor may include a length indicating the amount of data to transfer, but does not include a memory address. In some implementations, the length indicating the amount of data to transfer can be a 32-bit value, and the memory address used to address the host memory can be a 64-bit value. Assuming that the memory descriptor does not include any additional bits in this example, the length of each memory descriptor can be reduced from 96 bits down to 32 bits. Reducing the length of the memory descriptor means that the amount of data that the device driver has to write to descriptor memory 284 for each memory descriptor can be reduced. Using the example above, the effect of utilizing address-less memory descriptors is that the device driver can write 3 times the number of memory descriptors to descriptor memory 284 in a given period of time as compared to memory descriptors that contain both address and length. This can improve the data throughput of data movement engine 250 and achieve higher packet transfer rate (e.g., number of packets per second), because host-to-device data mover 290 can process more memory descriptors and thus transfer more data in a given period of time than implementations with lengthy memory descriptors.

In some implementations, a credit mechanism can be used to indicate to the device driver the number of available descriptors that the device driver can write to. The credit mechanism may utilize a consumed counter and a limit counter. The difference between these two counters indicates the number of available credits corresponding to the number of available descriptors that the device driver can write to. In some implementations, theses counters can be implemented as 32-bit rolling counters. These counters are present in both the device driver and host-to-device data mover 290. However, the device driver's copy of the limit counter is updated by host-to-device data mover 290 after host-to-device data mover 290 reads a descriptor from descriptor memory 284.

The consumed counter is initialized to zero. When the device driver writes a descriptor, the device driver increments its copy of the consumed counter. When host-to-device data mover 290 receives this descriptor in descriptor memory 284, host-to-device data mover 290 increments its copy of the consumed counter. The limit counter is initialized to the number of available credits. When host-to-device data mover 290 processes a descriptor, host-to-device data mover 290 increment its copy of the consumed counter, and also updates the device driver's copy of the consumed counter. The device driver can compute the difference between the limit counter and consumed counter locally to determine how many descriptors can be written.

When a descriptor is received in descriptor memory 284, host-to-device data mover 290 can read the address-less memory descriptor to determine the length of the data transfer. Host-to-device data mover 290 may determine if the host-to-device data buffer 294 can accommodate the size of the data transfer and initiate the data transfer from the host memory. Host-to-device data mover 290 is configured to maintain a host-to-device read pointer 292 that is used to determine the next physical memory address in the host memory to read data from. At initialization, the device driver allocates a host-to-device contiguous block of memory in the host memory that is dedicated for host-to-device data transfers from the host application to the peripheral component. The host-to-device read pointer 292 can be initialized to point to the beginning of the host-to-device contiguous block of memory allocated by the device driver. When an address-less memory descriptor is processed, host-to-device data mover 290 determines the amount of data to read from the host memory using the length indicated in the address-less memory descriptor, and reads that amount of data starting at the memory location in the host memory indicated by the host-to-device read pointer 292. The host-to-device read pointer 292 is then updated by incrementing the host-to-device read pointer 292 by a value corresponding to the length of the data read by host-to-device data mover 290. In some implementations, the host-to-device read pointer 292 can be incremented in steps corresponding to a natural boundary of the system such as the data transfer bus width of the data movement engine 250. The data read from the host memory by host-to-device data mover 290 is then provided to the host-to-device data buffer 294 for transmission to the peripheral component.

In the device-to-host direction, device-to-host data engine 260 may include a device-to-host data buffer 274 and a device-to-host data mover 270. Device-to-host data buffer 274 may receive data intended for the host application from a peripheral component via communication interface 262. Device-to-host data buffer 274 may wait until a minimum threshold amount of data has been received before providing the data to device-to-host data mover 270 for placement into the host memory. In some implementations, device-to-host data buffer 274 may also transmit data to device-to-host data mover 270 when the data in device-to-host data buffer 274 contains an end-of-packet indicating the end of a data packet.

Device-to-host data mover 270 is configured to maintain a device-to-host write pointer 272 that is used to determine the next physical memory address in the host memory to write data to. At initialization, the device driver allocates a device-to-host contiguous block of memory in the host memory that is dedicated for device-to-host data transfers from the peripheral component to the host application. The device-to-host write pointer 272 can be initialized to point to the beginning of the host-to-device contiguous block of memory allocated by the device driver. When host-to-device data buffer 274 provides data from the peripheral component to device-to-host data mover 270, device-to-host data mover 270 determines the length of the data, and write the data into the host memory starting at the memory location indicated by the device-to-host write pointer 272. The device-to-host write pointer 272 is then incremented by a value corresponding to the length of the data written by device-to-host data mover 270. In some implementations, the device-to-host write pointer 272 can be incremented in steps corresponding to a natural boundary of the system such as the data transfer bus width of the data movement engine 250.

To inform the device driver that new data has been written to the host memory, device-to-host data mover 270 may provide write-back metadata containing a length of the data transfer to the device driver. A circular buffer or ring queue can be implemented in the host memory to store the write-back metadata entries. Device-to-host data mover 270 can maintain a metadata write pointer to point to the next available metadata entry. When device-to-host data mover 270 writes data to the host memory for the host application, device-to-host data mover 270 can also write the write-back metadata for the data transfer to the next available metadata entry as indicated by the metadata write pointer. In some implementations, the metadata entry may also include a valid bit that is set by the device-to-host data mover 270 to indicate that the metadata entry is valid. The device driver can periodically poll the valid bit to determine if new data has been written to the host memory. In some implementations, device-to-host data mover 270 can increment a write-back metadata counter, and the device driver can poll the write-back metadata counter to determine if new data has been written to the host memory.

The device driver is configured to maintain a device-to-host read pointer that is used to determine the next physical memory address in the host memory to read data from. At initialization, the device-to-host read pointer can be initialized to point to the beginning of the device-to-host contiguous block of memory allocated by the device driver. When the device driver determines that a new write-back metadata entry has been written, for example, by polling the valid bit of the next metadata entry or by polling the write-back metadata counter to determine if the counter has incremented, the device driver can read the write-back metadata entry. The amount of data for the data transfer can be determined based on the length indicated in the write-back metadata. The device driver may then read that amount of data from the host memory starting at the memory location indicated by the device-to-host read pointer, and provide the data read from the host memory to the host application. The device driver also updates the device-to-host read pointer by incrementing the pointer with a value corresponding to the length of the data read from the host memory.

As described above, by using a host-to-device contiguous block of memory to transfer data from device-to-host data mover 270 to the host memory, device-to-host data mover 270 can independently keep track of the next available physical memory address in the host memory to write to. This eliminates the need for device-to-host data mover 270 to obtain memory descriptors from the device driver when transferring data from the peripheral component to the host application. As a result, data throughput in the device-to-host direction can also be improved because data can be written to the host memory without having to wait for device-to-host data mover 270 to obtain any memory descriptors.

FIGS. 3-10 illustrate a series of example interactions between a device driver, a data movement engine, and host memory to transfer host-to-device data from a host application to a peripheral component, and device-to-host data from a peripheral component to a host application. FIGS. 3-6 illustrate an example of host-to-device data transfer, and FIGS. 7-10 illustrate an example of device-to-host data transfer.

Figure 3:
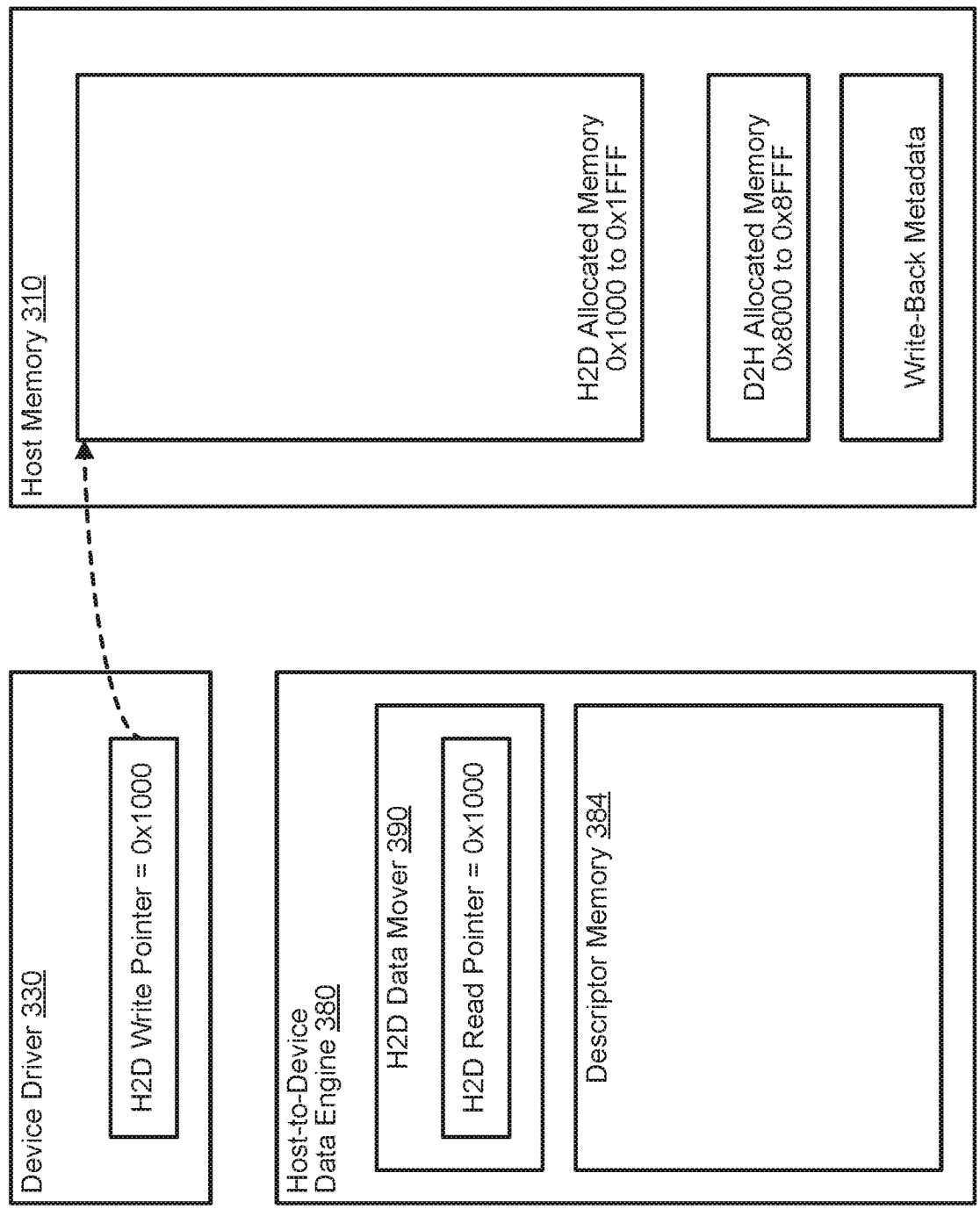
FIGS. 3-6 illustrate a series of conceptual diagrams showing a host-to-device data transfer, according to certain aspects of the disclosure.

Referring to FIG. 3, at initialization, device driver 330 may allocate a host-to-device contiguous block of memory in host memory 310 for host-to-device direct memory access data transfers from a host application to a peripheral component. Device driver 330 may also allocate a device-to-host contiguous block of memory in host memory 310 for device-to-host direct memory access data transfers from a peripheral component to a host application. In the example shown in FIG. 3, the host-to-device contiguous block of memory spans physical memory addresses 0x1000 to 0x1FFF, and the device-to-host contiguous block of memory spans physical memory addresses 0x8000 to 0x8FFF. It should be noted that the host-to-device contiguous block of memory need not be the same size as the device-to-host contiguous block of memory, and that the two blocks of memories need not be contiguous with each other. A portion of host memory can also be reserved for write-back metadata used during device-to-host data transfers.

To perform host-to-device data transfers, the host-to-device write pointer maintained by device driver 330 and the host-to-device read pointer maintained by host-to-device data mover 390 in the data movement engine are initialized to point to the starting memory address of the host-to-device contiguous block of memory. Thus, in the example shown in FIG. 3, these pointers are initialized to point to memory address 0x1000. The host-to-device write pointer is incremented when device driver 330 writes data to host memory 310, and the host-to-device read pointer is incremented when host-to-device data mover 390 reads data from host memory 310. Both of these pointers roll over at a value corresponding to the size of the host-to-device contiguous block of memory to point back to a starting memory address of the host-to-device contiguous block of memory.

Device driver 330 may receive a request from the host application to transfer host-to-device data to the peripheral component. Device driver 330 may determine a host-to-device memory address in the host-to-device contiguous block of memory to write to. The host-to-device memory address can be determined based on the host-to-device write pointer maintained by device driver 330, which is pointing to memory address 0x1000 at this point in time. As such, device driver 330 writes the host-to-device data into the host-to-device contiguous block of memory starting at memory address 0x1000.

Figure 4:
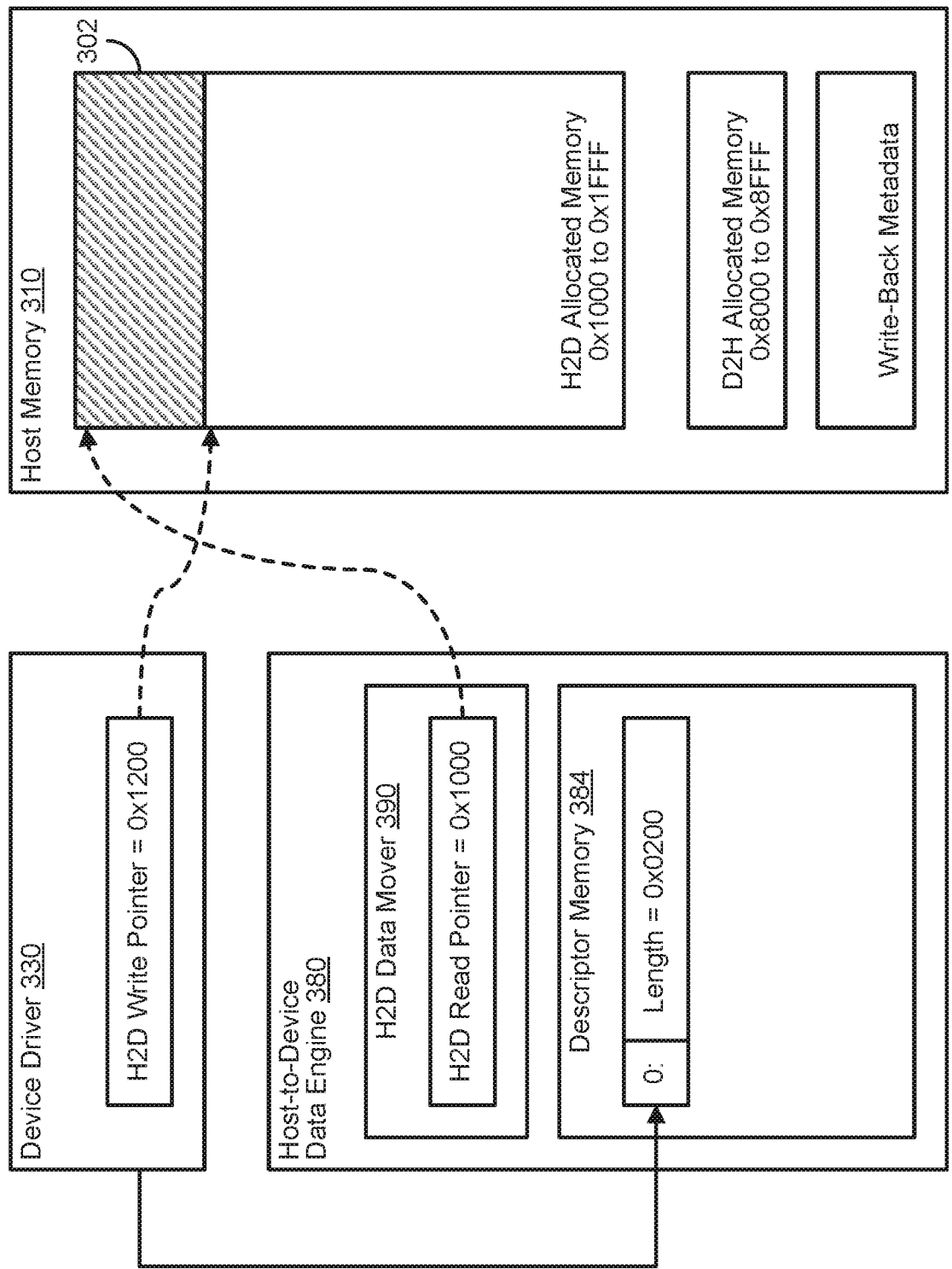

Referring to FIG. 4, the length of the data being written from the host application for this data transfer is 0x0200 in this example, and is shown as the shaded block of data 302 in the host-to-device contiguous block of memory. Device driver 330 may then generate an address-less memory descriptor containing a value representing this length (e.g., 0x2000), and provide the address-less memory descriptor to host-to-device data engine 380. For example, device driver 330 may write the address-less memory descriptor to the next available entry in descriptor memory 384. Upon writing the host-to-device data into host memory 310, device driver 330 also increments the host-to-device write pointer by a value corresponding to the length of the device-to-host data, such that the host-to-device write pointer is updated to point to the next available memory location in the host-to-device contiguous block of memory. In some implementations, the host-to-device write pointer can be incremented in steps corresponding to a natural boundary of the system such as the data transfer bus width of the data movement engine. As shown in FIG. 4, the host-to-device write pointer is updated to point to memory address 0x1200 in this example.

Figure 5:
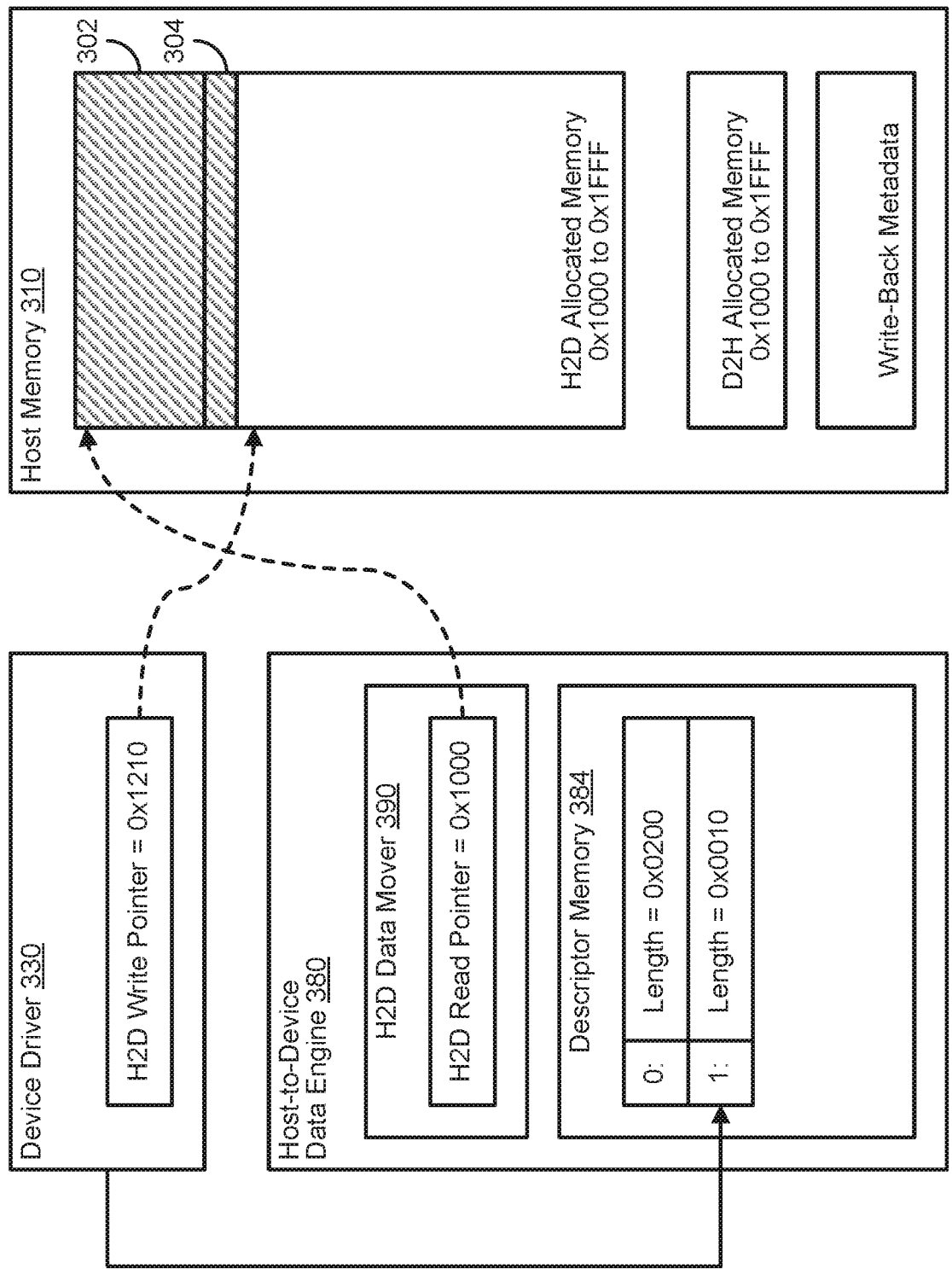

When device driver 330 receives another request from the host application to transfer host-to-device data to the peripheral component, device driver 330 may determine a host-to-device memory address based on the host-to-device write pointer, which is pointing to memory address 0x1200 at this point in time. Referring to FIG. 5, the length of data for this second data transfer can be, for example, 0x0010, and device driver 330 writes this amount of data starting at memory address 0x1200 in host memory 310. This data for the second data transfer is shown as the second shaded block of data 304. Device driver 330 may then generate an address-less memory descriptor containing a length of the host-to-device data for this second data transfer; and provide the address-less memory descriptor to host-to-device data engine 380. For example, device driver 330 may write the address-less memory descriptor with the value 0x0010 to the next available entry in descriptor memory 384 as shown in FIG. 5. Upon writing the host-to-device data into host memory 310, device driver 330 also updates the host-to-device write pointer to point to the next available memory location in the host-to-device contiguous block of memory, which is memory address 0x1210.

To read the host-to-device data from host memory 310, host-to-device data mover 390 determines that an address-less memory descriptor associated with a host-to-device data transfer has been stored in the descriptor memory 384, and obtains the first available address-less memory descriptor from descriptor memory 384. Host-to-device data mover 390 can determine a host-to-device memory address based on the host-to-device read pointer maintained by host-to-device data mover 390. Host-to-device data mover 390 can then read the host-to-device data from the host-to-device contiguous memory using the determined host-to-device memory address and the length in the address-less memory descriptor. In FIG. 5, the first available address-less memory descriptor contains a value indicating a length of 0x0200, and the host-to-device read pointer is pointing to the memory address 0x1000. Thus, host-to-device data mover 390 reads 0x0200 amount of data from the host-to-device contiguous memory starting at memory address 0x1000.

Figure 6:
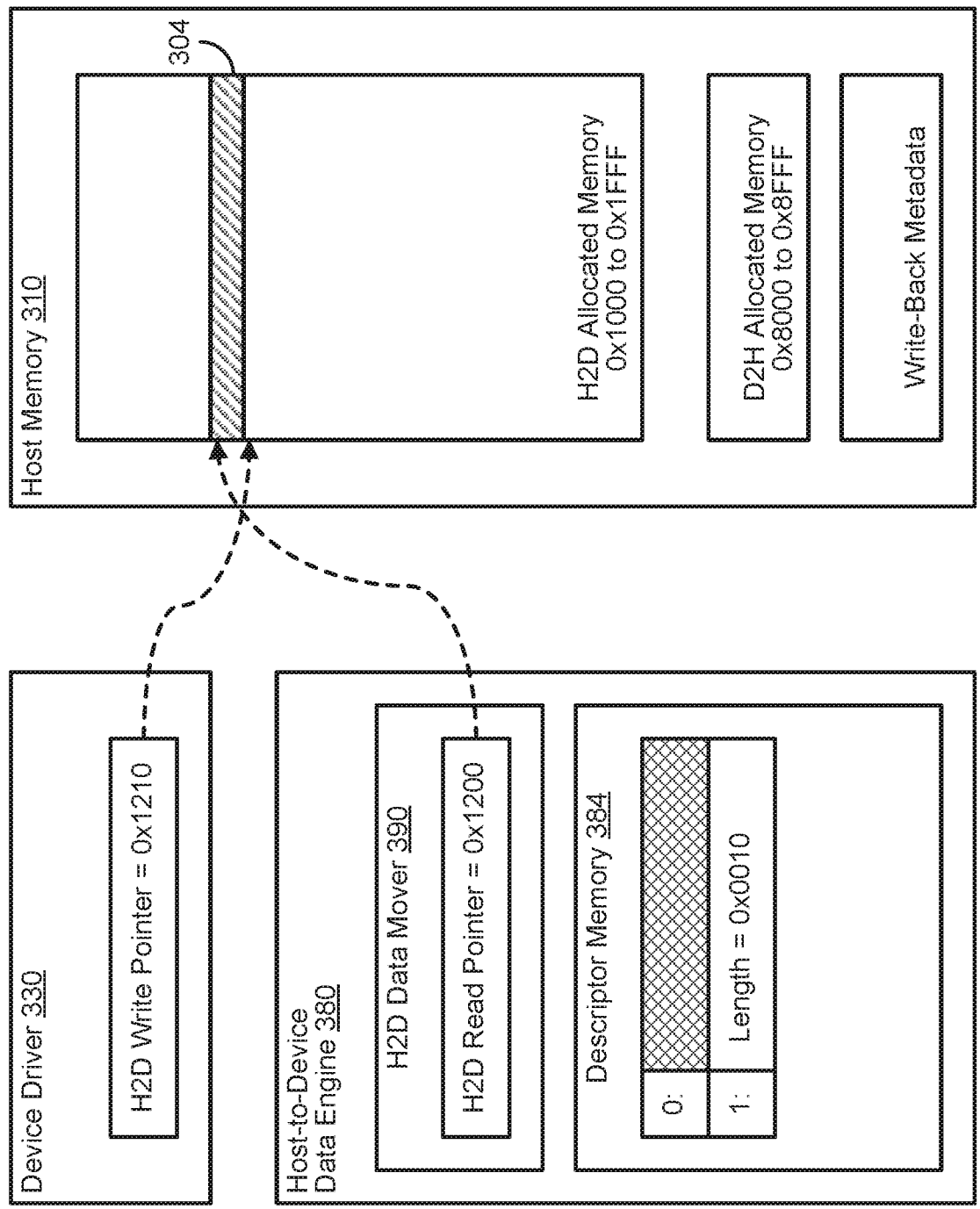

Referring to FIG. 6, after reading the block of data 302, host-to-device data mover 390 can update the host-to-device read pointer by incrementing the pointer by a value corresponding to the length indicated in the address-less memory descriptor, or the amount of data read from host memory 310. Thus, the host-to-device read pointer is updated to 0x1200 such that the pointer points to the next memory address in host memory 310 to read. In some implementations, the host-to-device read pointer can be incremented in steps corresponding to a natural boundary of the system such as the data transfer bus width of the data movement engine. Host-to-device data mover 390 can also notify the device driver or the host system that the host-to-device data transfer is complete. For example, host-to-device data mover 390 can increment a data transfer counter, and device driver 330 can poll the counter to determine that the host-to-device data transfer has complete. Device driver 330 can also be informed of the data transfer completion by reading the host-to-device read pointer and determining that the pointer has incremented. Device driver 330 can then free up the memory space previously occupied by data block 302. Host-to-device mover 390 can also free up the memory descriptor entry in descriptor memory 384. The process can continue to transfer additional host-to-device data.

Figure 7:
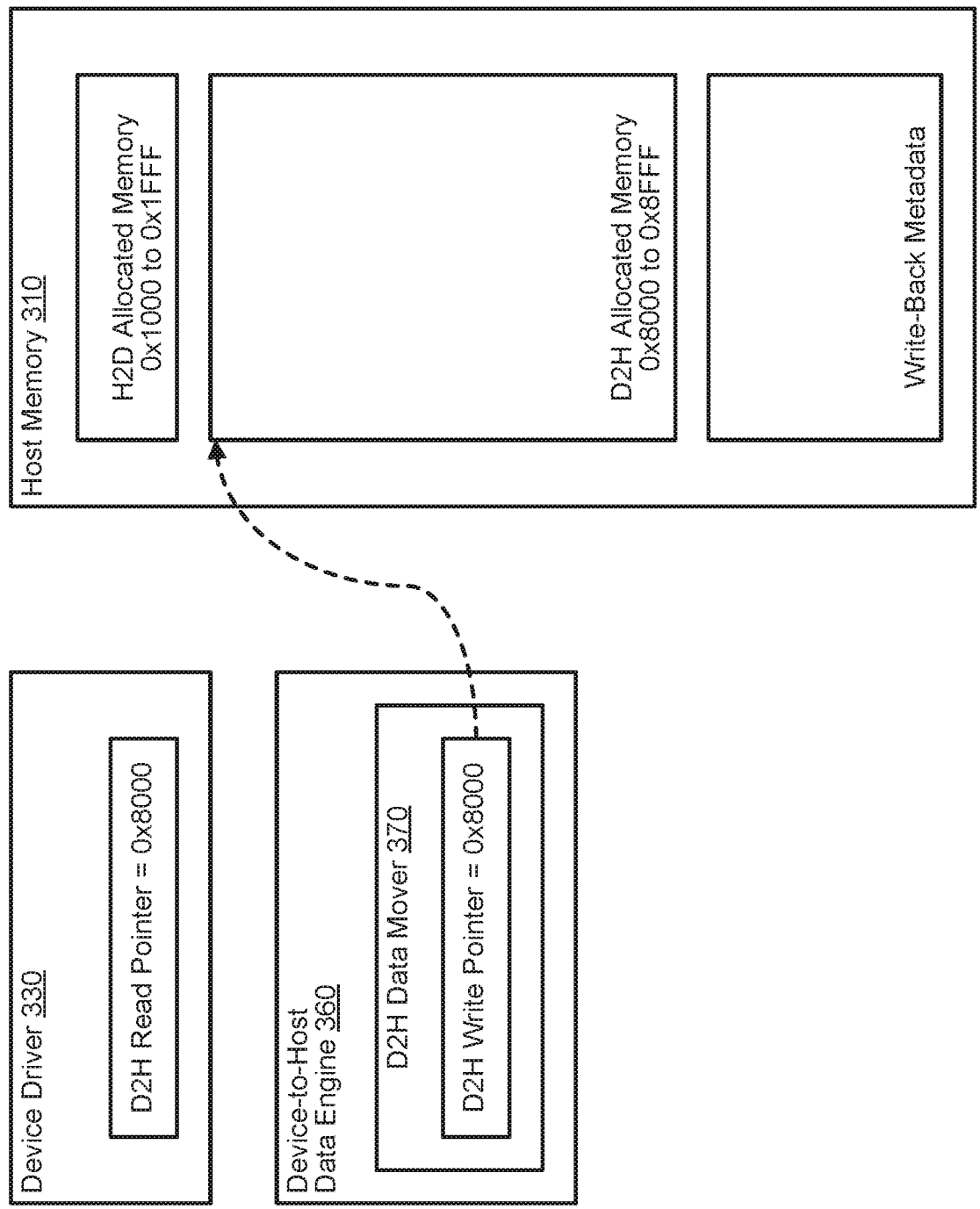
FIGS. 7-10 illustrate a series of conceptual diagrams showing a device-to-host data transfer, according to certain aspects of the disclosure.

Referring now to FIG. 7, to perform device-to-host data transfers, the device-to-host write pointer maintained by device-to-host data mover 370 in the data movement engine and the device-to-host read pointer maintained by device driver 330 are initialized to point to the starting memory address of the device-to-host contiguous block of memory. Thus, in the example shown in FIG. 7, these pointers are initialized to point to memory address 0x8000. The device-to-host write pointer is incremented when device-to-host data mover 370 writes data to host memory 310, and the device-to-host read pointer is incremented when device driver 330 reads data from host memory 310. Both of these pointers roll over at a value corresponding to the size of the device-to-host contiguous block of memory to point back to a starting memory address of the device-to-host contiguous block of memory.

Device-to-host data mover 370 may receive a request from the peripheral component to transfer device-to-host data to the host application. Device-to-host data mover 370 may determine a device-to-host memory address in the device-to-host contiguous block of memory to write to. The device-to-host memory address can be determined based on the device-to-host write pointer maintained by device-to-host data mover 370, which is pointing to memory address 0x8000 at this point in time. As such, device-to-host data mover 370 writes the device-to-host data into the device-to-host contiguous block of memory starting at memory address 0x8000.

Figure 8:
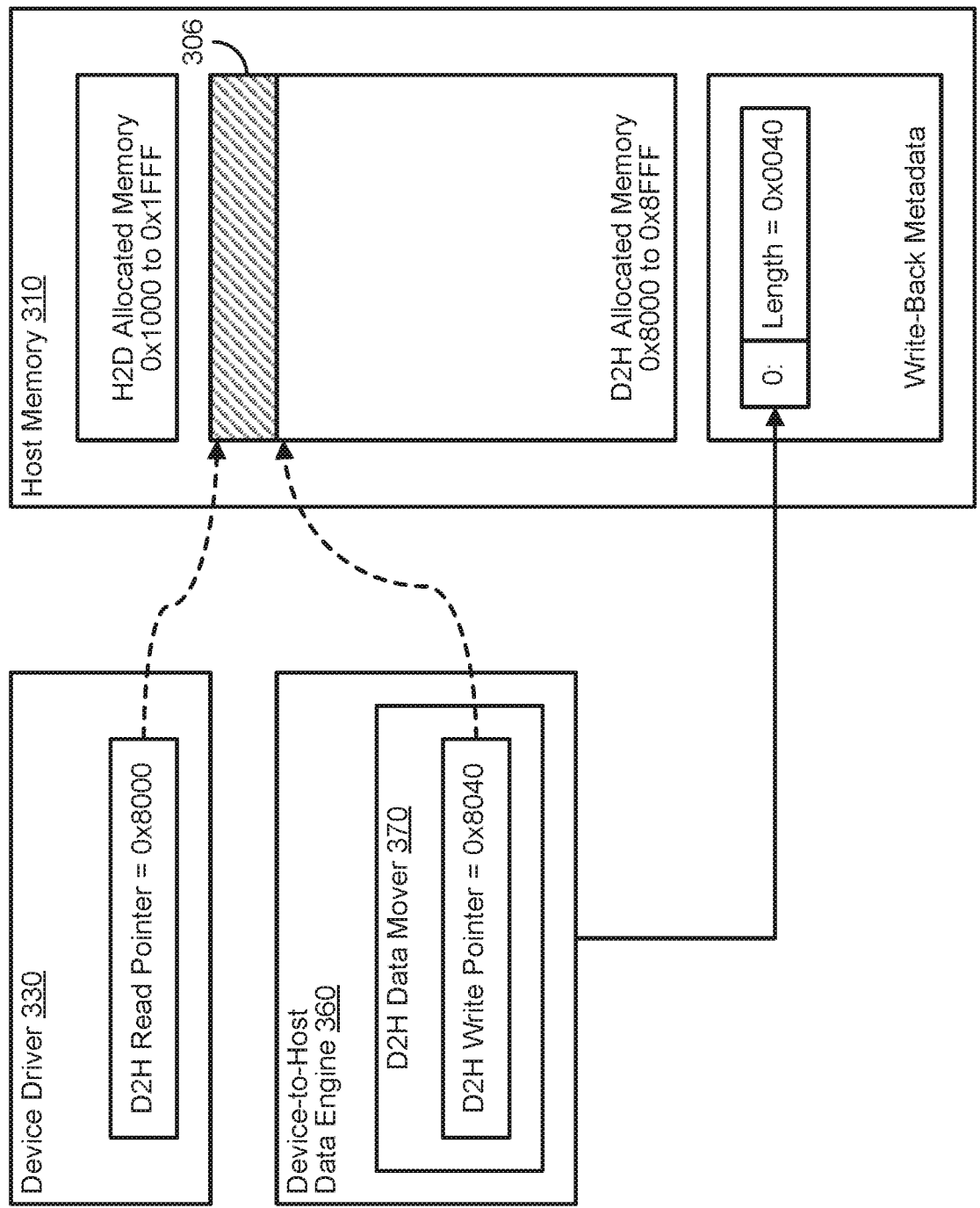

Referring to FIG. 8, the length of the data being written from the peripheral component for this data transfer is 0x0040 and is shown as the shaded block of data 306 in the device-to-host contiguous block of memory. Device-to-host data mover 370 may then generate write-back metadata containing a value indicating the length of the data transfer (e.g., 0x0040), and provide the write-back metadata to the host system. For example, device-to-host data mover 370 can write the write-back metadata to the next metadata entry in the portion of host memory 310 reserved for write-back metadata. Upon writing the device-to-host data into host memory 310, device-to-host data mover 370 also increments the device-to-host write pointer by a value corresponding to the length of the device-to-host data, such that the device-to-host write pointer is updated to point to the next available memory location in the device-to-host contiguous block of memory. In some implementations, the device-to-host write pointer can be incremented in steps corresponding to a natural boundary of the system such as the data transfer bus width of the data movement engine. As shown in FIG. 8, the device-to-host write pointer is updated to point to memory address 0x8040 in this example.

Figure 9:
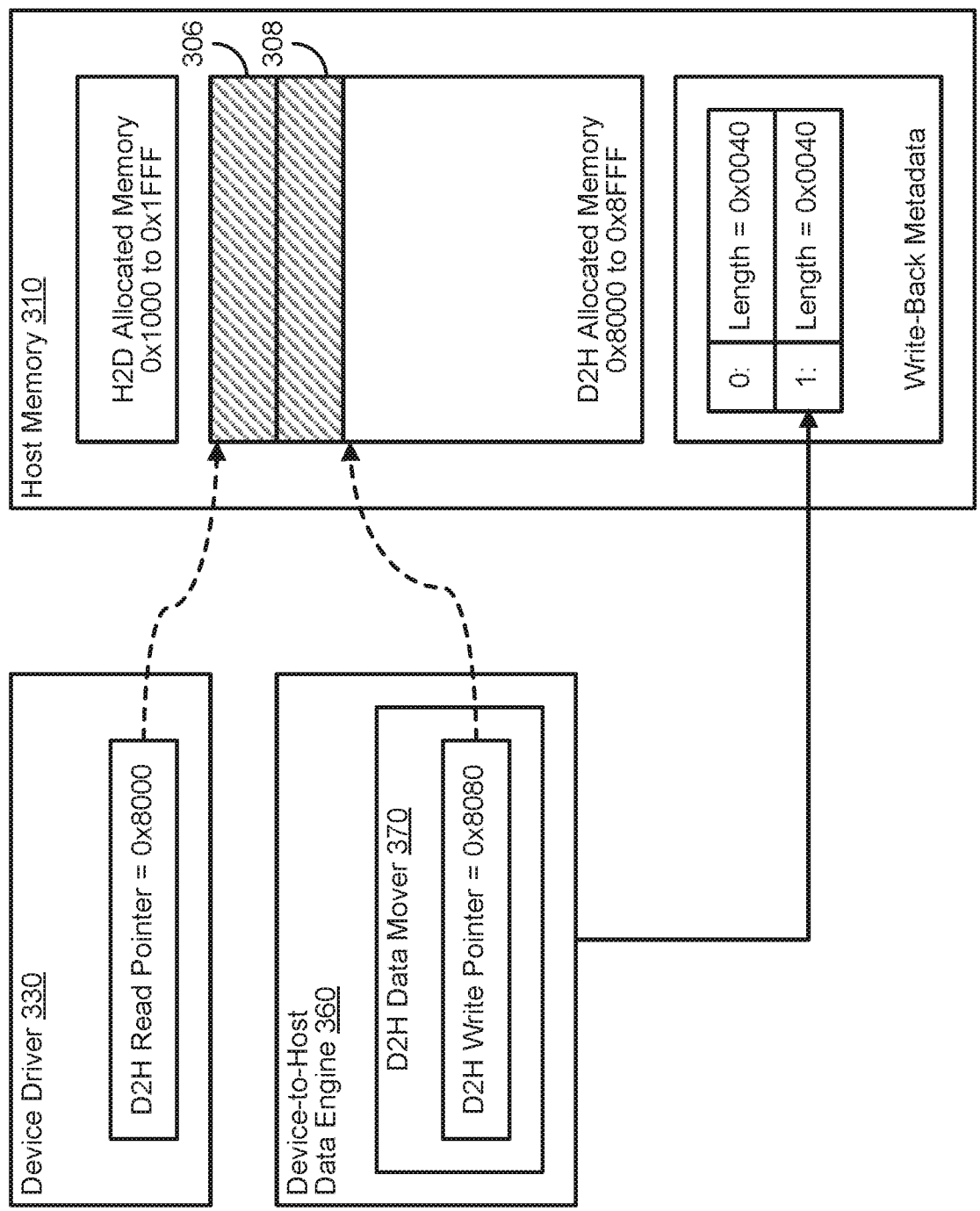

When device-to-host data mover 370 receives another request from the peripheral component to transfer device-to-host data to the host application, device-to-host data mover 370 may determine a device-to-host memory address based on the device-to-host write pointer, which is pointing to memory address 0x8040 at this point in time. Referring to next FIG. 9, the length of data for this second data transfer can be, for example, 0x0040, and device-to-host data mover 370 writes this amount of data starting at memory address 0x8040 in host memory 310. This data for the second data transfer is shown as the second shaded block of data 308. device-to-host data mover 370 may then generate write-back metadata containing a length of the device-to-host data for this second data transfer; and provide the write-back metadata to the host system. For example, device-to-host data mover 370 may write the write-back metadata with the value 0x0040 to the next available metadata entry as shown in FIG. 9. Upon writing the device-to-host data into host memory 310, device-to-host data mover 370 also updates the device-to-host write pointer to point to the next available memory location in the device-to-host contiguous block of memory, which is memory address 0x8080.

To read device-to-host data from host memory 310, device driver 330 determines that write-back metadata associated with a device-to-host data transfer has been stored in host memory 310, and reads the first write-back metadata from host memory 310. Device driver 330 can determine a device-to-host memory address based on the device-to-host read pointer maintained by device driver 330. Device driver 330 can then read the device-to-host data from the device-to-host contiguous memory using the determined device-to-host memory address and the length indicated in the write-back metadata. In FIG. 9, the first write-back metadata contains a value indicating a length of 0x0040, and the device-to-host read pointer is pointing to the memory address 0x8000. Thus, device driver 330 reads 0x0040 amount of data from the device-to-host contiguous memory starting at memory address 0x8000.

Figure 10:
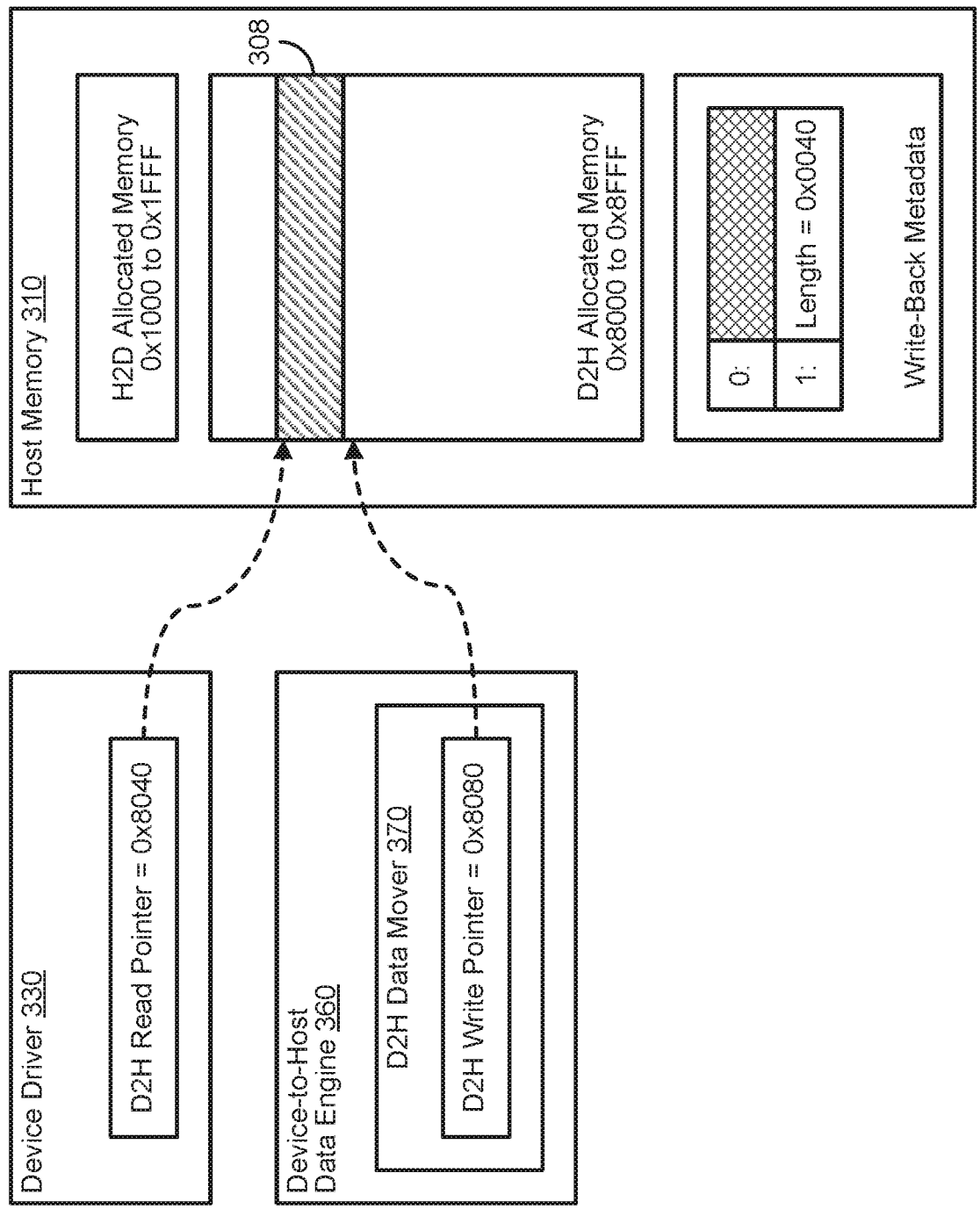

Referring to FIG. 10, after reading the block of data 306, device driver 330 can update the device-to-host read pointer by incrementing the pointer by a value corresponding to the length indicated in the write-back metadata, or the amount of data read from host memory 310. Thus, the device-to-host read pointer is updated to 0x8040 such that the pointer points to the next memory address in host memory 310 to read. In some implementations, the device-to-host read pointer can be incremented in steps corresponding to a natural boundary of the system such as the data transfer bus width of the data movement engine. Device driver 330 can also notify the device-to-host data mover 370 that the device-to-host data transfer is complete. For example, device driver 370 can increment a data transfer counter. The device-to-host data mover 370 can also be informed of the data transfer completion by reading the device-to-host read pointer and determining that the pointer has incremented. Device driver 330 can also free up the memory space previously occupied by data block 306 and the write-back metadata entry. The process can continue to transfer additional device-to-host data.

Figure 11:
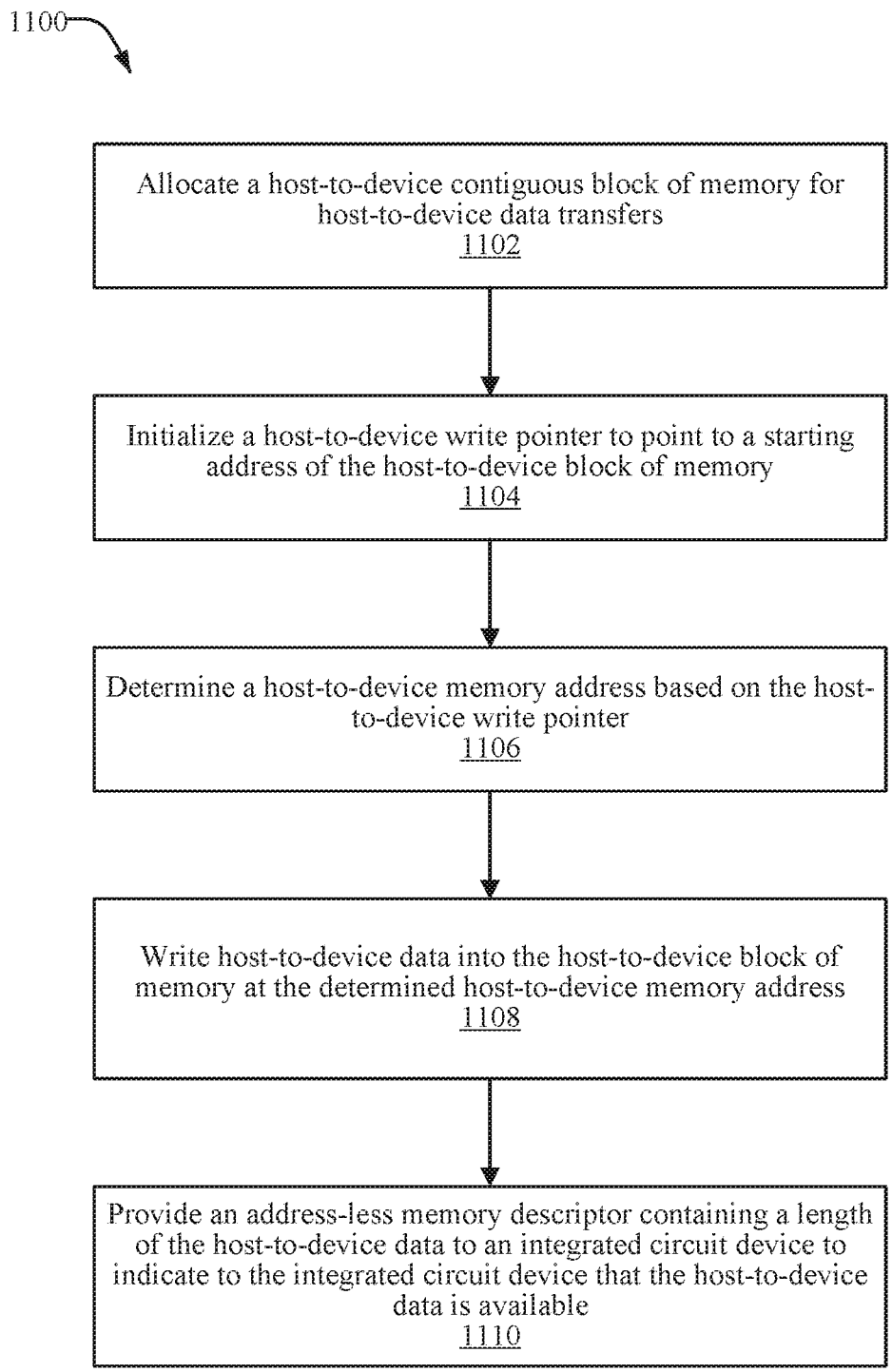
FIG. 11 illustrates a flow diagram of an example of a process for host-to-device data transfer, according to certain aspects of the disclosure.

FIG. 11 illustrates a flow diagram of an example of a process 1100 for transferring data from a host system to an integrated circuit device, according to some implementations. Process 1100 can be performed, for example, by a device driver running on the host system. The integrated circuit device can be, for example, a data movement engine (e.g., direct memory access engine, streaming data engine, etc.), or a peripheral device that incorporates a data movement engine.

Process 1100 may begin at block 1102 by allocating a host-to-device contiguous block of memory in the host memory for host-to-device direct memory access transfers. In some implementations, the host-to-device contiguous block of memory can be 256 M-bytes, 512 M-bytes, 1 G-byte, 2 G-bytes, or more. In some implementations, the contiguous block of memory can be referred to as a memory page. The host-to-device contiguous block of memory can act as a circular buffer such that data is written sequentially into the host-to-device contiguous block of memory, and rolls over to the beginning of the contiguous block of memory when the end of the contiguous block of memory is reached.

At block 1104, a host-to-device write pointer is initialized to point to a starting address of the host-to-device contiguous block of memory. The starting address (e.g., a physical memory address in the host memory) can also be provided to the integrated circuit device such that a host-to-device read pointer maintained by integrated circuit device can be initialized to the same memory address.

At block 1106, a request to transfer data from the host system (e.g., a host application) to the integrated circuit device is received, and a host-to-device memory address based on the host-to-device write pointer is determined. The host-to-device memory address determined at block 1106 indicates the next available memory location to write to.

At block 1108, the host-to-device data is written into the host-to-device contiguous block of memory starting at the determined host-to-device memory address. The length representing the amount of host-to-device data written into the host-to-device contiguous block of memory for this data transfer can also be determined, and the host-to-device write pointer is incremented by a value corresponding to the length of the host-to-device data.

At block 1110, an address-less memory descriptor containing a length of the host-to-device data is generated, and is provided to an integrated circuit device to indicate to the integrated circuit device that new host-to-device data is available in the host memory. For example, the address-less memory descriptor can be written into a descriptor memory of the integrated circuit device. The address-less memory descriptor does not include a memory address, and thus requires less bits than memory descriptors that includes both an address and length. This can improve data throughput of the system by reducing the number of communications used to provide the integrated circuit device with the memory descriptors.

When the integrated circuit device receives the address-less memory descriptor, the integrated circuit device can determined the length of the data transfer, and read that amount of host-to-device data from the host memory starting at the memory address indicated by the host-to-device read pointer maintained by integrated circuit device. The integrated circuit device can then update the host-to-device read pointer by incrementing the pointer with a value corresponding to the length of the host-to-device data.

Figure 12:
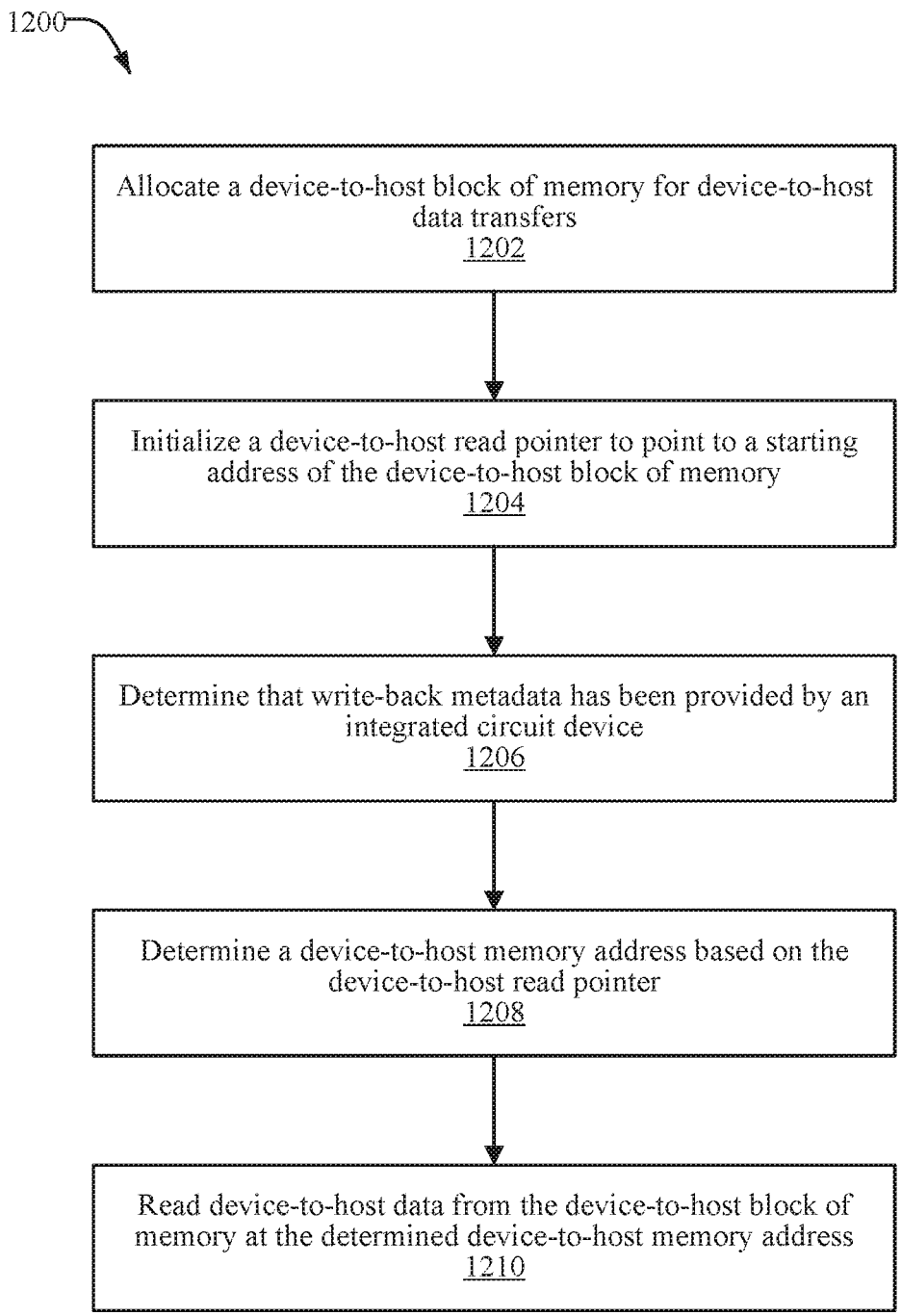
FIG. 12 illustrates a flow diagram of an example of a process for device-to-host data transfer, according to certain aspects of the disclosure.

FIG. 12 illustrates a flow diagram of an example of a process 1200 for transferring data from an integrated circuit device to a host system, according to some implementations. Process 1200 can be performed, for example, by a device driver running on the host system. The integrated circuit device can be, for example, a data movement engine (e.g., direct memory access engine, streaming data engine, etc.), or a peripheral device that incorporates a data movement engine.

Process 1200 may begin at block 1202 by allocating a device-to-host contiguous block of memory in the host memory for device-to-host direct memory access transfers. In some implementations, the device-to-host contiguous block of memory can be 256 M-bytes, 512 M-bytes, 1 G-byte, 2 G-bytes, or more. In some implementations, the contiguous block of memory can be referred to as a memory page. The device-to-host contiguous block of memory can act as a circular buffer such that data is written sequentially into the device-to-host contiguous block of memory, and rolls over to the beginning of the contiguous block of memory when the end of the contiguous block of memory is reached.

At block 1204, a device-to-host read pointer is initialized to point to a starting address of the device-to-host contiguous block of memory. The starting address (e.g., a physical memory address in the host memory) can also be provided to the integrated circuit device such that a device-to-host write pointer maintained by integrated circuit device can be initialized to the same memory address.

The integrated circuit device may write device-to-host data to the device-to-host contiguous block of memory at the memory address indicated by the device-to-host write pointer maintained by integrated circuit device, and the integrated circuit device may provide write-back metadata indicating a length of the device-to-host data written into the device-to-host contiguous block of memory. For example, the write-back metadata can be written to a portion of the host memory used for storing write-back metadata. Upon writing the device-to-host data to the device-to-host contiguous block of memory, the integrated circuit device can update the device-to-host write pointer by incrementing the pointer with a value corresponding to the length of the device-to-host data.

At block 1206, it is determined that the write-back metadata has been provided by the integrated circuit device to indicate to the host system that new device-to-host data is available in the host memory. The write-back metadata can be read, and the length of the device-to-host data associated with the data transfer can be determined. At block 1208, a device-to-host memory address is determined based on the device-to-host read pointer. The device-to-host memory address determined at block 1206 indicates the next memory location to read from.

At block 1210, an amount of device-to-host data corresponding to the length indicated in the write-back metadata is read from the device-to-host contiguous block of memory starting at the determined device-to-host memory address. The device-to-host read pointer can then be updated by incrementing the pointer with a value corresponding to the length of the device-to-host data.

Although the techniques described above may refer to allocating one continuous block of memory for each direction of data transfer, other implementations can allocate multiple contiguous blocks of memory for data transfer in either or both directions. For example, each transfer direction may include two, four, eight, or sixteen contiguous blocks of memory, and each contiguous block of memory can be 512 M-bytes or bigger. When multiple contiguous blocks of memory are allocated for a direction of data transfer, each contiguous block of memory can be associated with its own set of read and write pointers that are maintained by the device driver/integrated circuit device, and each contiguous block of memory can be associated with its own descriptor memory/write-back metadata storage.

In some implementations, non-contiguous portions of memory or multiple blocks of memory that are not physically contiguous can also be allocated as a virtual block of contiguous memory. In such implementations, the read and write pointers can be configured to jump across the non-allocated portions of memory when being incremented. For example, a block of memory from address 0x0000 to 0x1FFF and a block of memory from address 0x3000 to 0x3FFF can be allocated for a direction of data transfer. When the read or write pointer reaches memory address 0x1FFF, the next memory address pointed to by incrementing the pointer will be memory address 0x3000. In this manner, even though the two blocks of memory are non-contiguous, they can nevertheless act as a virtual contiguous block of memory.

Figure 13:
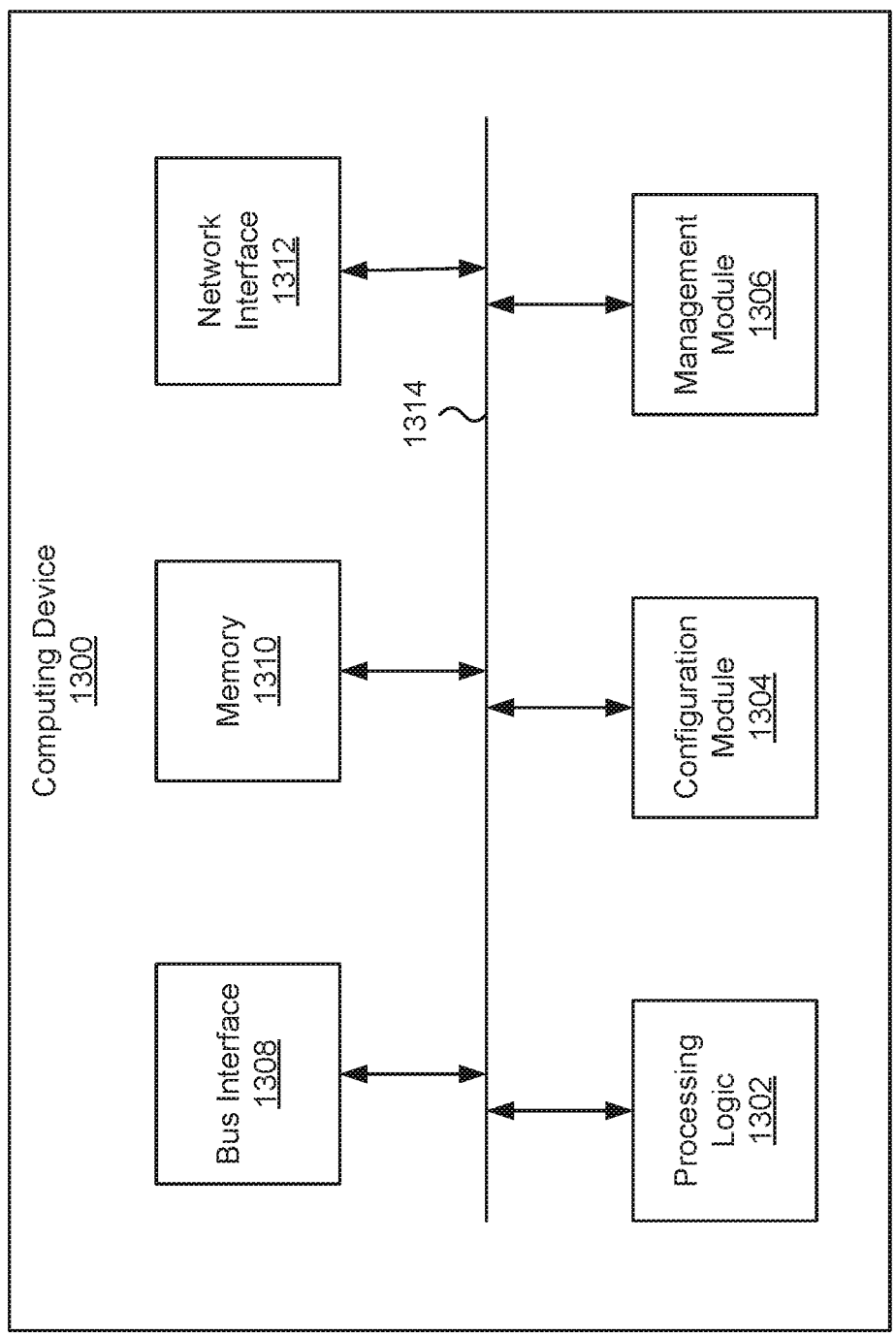
FIG. 13 illustrates an example of a computing device, according to certain aspects of the disclosure.

FIG. 13 illustrates an example of a computing device 1300. Functionality and/or several components of the computing device 1300 may be used without limitation with other embodiments disclosed elsewhere in this disclosure, without limitations. A computing device 1300 may facilitate processing of packets and/or forwarding of packets from the computing device 1300 to another device. As referred to herein, a "packet" or "data packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1300 may be the recipient and/or generator of packets. In some implementations, the computing device 1300 may modify the contents of the packet before forwarding the packet to another device. The computing device 1300 may be a peripheral device coupled to another computer device, a switch, a router or any other suitable device enabled for receiving and forwarding packets.

In one example, the computing device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The computing device 1300 may include additional modules, not illustrated here, such as components discussed with respect to the nodes disclosed in FIG. 14. In some implementations, the computing device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the computing device 1300, while in other cases some or all of the memory may be external to the computing device 1300. The memory 1310 may store an operating system comprising executable instructions that, when executed by the processing logic 1302, provides the execution environment for executing instructions providing computing functionality for the computing device 1300. The memory may also store and maintain several data structures and routing tables for facilitating the functionality of the computing device 1300.

In some implementations, the configuration module 1304 may include one or more configuration registers. Configuration registers may control the operations of the computing device 1300. In some implementations, one or more bits in the configuration register can represent certain capabilities of the computing device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the computing device 1300.

In some implementations, the management module 1306 may be configured to manage different components of the computing device 1300. In some cases, the management module 1306 may configure one or more bits in one or more configuration registers at power up, to enable or disable certain capabilities of the computing device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the computing device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1300 may include multiple network interface modules, each configured to communicate with a different network. For example, in these implementations, the computing device 1300 may include a network interface module for communicating with a wired Ethernet network, a wireless 802.11 network, a cellular network, an Infiniband network, etc.

The various components and modules of the computing device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 14.

Figure 14:
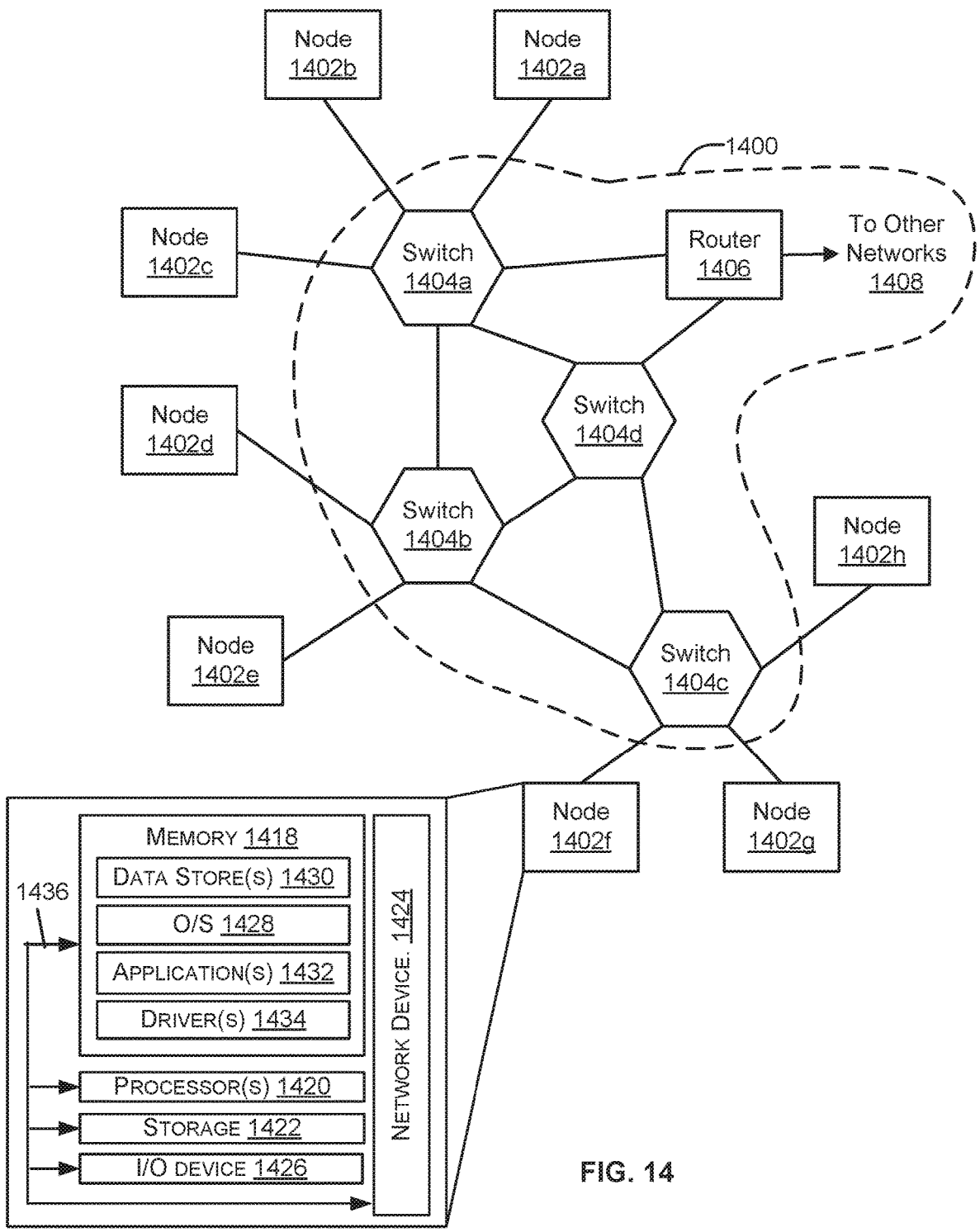
FIG. 14 illustrates an example architecture for features and systems described herein that includes one or more service provider computers and/or a user device connected via one or more networks, according to certain aspects of the disclosure.

FIG. 14 illustrates a network 1400, illustrating various different types of network devices 1300 of FIG. 13, such as nodes comprising the network device, switches and routers. In certain embodiments, the network 1400 may be based on a switched architecture with point-to-point links. As illustrated in FIG. 14, the network 1400 includes a plurality of switches 1404*a*-1404*d*, which may be arranged in a network. In some cases, the switches are arranged in a multi-layered network, such as a Clos network. A network device 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404*a*-1404*d* may be connected to a plurality of nodes 1402*a*-1402*h* and provide multiple paths between any two nodes.

The network 1400 may also include one or more network devices 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404*a*-1404*d* and router 1406, if present, may be referred to as a switch fabric, a fabric, a network fabric, or simply a network. In the context of a computer network, terms "fabric" and "network" may be used interchangeably herein.

Nodes 1402*a*-1402*h* may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device (s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h.

Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402*a*-1402*h* may also include I/O device(s) 1426, such as a keyboard, a mouse, a pen, a voice input device, a touch input device, a display, speakers, a printer, and the like. The node(s) 1402*a*-1402*h* may also include one or more communication channels 1436. A communication channel 1436 may provide a medium over which the various components of the node(s) 1402*a*-1402*h* can communicate. The communication channel or channels 1436 may take the form of a bus, a ring, a switching fabric, or a network.

The node(s) 1402*a*-1402*h* may also contain network device(s) 1424 that allow the node(s) 1402*a*-1402*h* to communicate with a stored database, another computing device or server, user terminals and/or other devices on the network(s) 1400. The network device(s) 1424 of FIG. 14 may include similar components discussed with reference to the network device 1300 of FIG. 13.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1308 may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system, comprising:
   a device driver; and
   an integrated circuit device,
   wherein the device driver is configured to:
      allocate a host-to-device contiguous block of memory for host-to-device direct memory access (DMA) data transfers from a host application to the integrated circuit device;
      receive a request from the host application to write host-to-device data to the integrated circuit device;
      determine a host-to-device memory address in the host-to-device contiguous block of memory based on a host-to-device write pointer maintained by the device driver;
      write the host-to-device data into the host-to-device contiguous block of memory at the host-to-device memory address;
      generate an address-less memory descriptor that does not include a memory address, and contains a length of the host-to-device data; and
      provide the address-less memory descriptor to the integrated circuit device, and
   wherein the integrated circuit device is configured to:
      obtain the address-less memory descriptor;
      determine the host-to-device memory address based on a host-to-device read pointer maintained by the integrated circuit device; and
      read the host-to-device data from the host-to-device contiguous block of memory using the determined host-to-device memory address and the length in the address-less memory descriptor.

2. The computing system of claim 1, wherein the host-to-device write pointer and the host-to-device read pointer roll over at a value corresponding to a size of the host-to-device contiguous block of memory.

3. The computing system of claim 1,
   wherein the device driver is further configured to:
      allocate a device-to-host contiguous block of memory for device-to-host DMA data transfers from the integrated circuit device to the host application, and
   wherein the integrated circuit device is further configured to:
      write device-to-host data into the device-to-host contiguous block of memory at a device-to-host memory address determined based on a device-to-host write pointer maintained by the integrated circuit device; and
      provide write-back metadata to the device driver indicating a length of the device-to-host data.

4. The computing system of claim 3,
   wherein the device driver is further configured to:
      determine the device-to-host memory address based on a device-to-host read pointer maintained by the device driver; and
      read the device-to-host data from the device-to-host contiguous block of memory using the determined host-to-device memory address and the length in the write-back metadata.

5. An integrated circuit device comprising:
   a host interface configured to perform data transfers between the integrated circuit device and a host system;
   a descriptor memory configured to store address-less memory descriptors; and
   a host-to-device data mover configured to:
      determine that an address-less memory descriptor associated with a host-to-device data transfer has been stored in the descriptor memory, wherein the address-less memory descriptor lacks a memory address and contains a length of host-to-device data associated with the host-to-device data transfer;
      determine a host-to-device memory address based on a host-to-device read pointer;
      read the host-to-device data from a host-to-device block of memory at the determined host-to-device memory address via the host interface; and
      increment the host-to-device read pointer by the length indicated in the address-less memory descriptor.

6. The integrated circuit device of claim 5, wherein the host-to-device read pointer is initialized to point to a starting memory address of the host-to-device block of memory.

7. The integrated circuit device of claim 5, wherein the host-to-device read pointer rolls over at a value corresponding to a size of the host-to-device block of memory to point back to a starting memory address of the host-to-device block of memory.

8. The integrated circuit device of claim 5, wherein the host-to-device data mover is further configured to notify the host system that the host-to-device data transfer is complete.

9. The integrated circuit device of claim 5, further comprising a device-to-host data mover configured to perform a device-to-host data transfer by:
   determining a device-to-host memory address based on a device-to-host write pointer;
   writing device-to-host data associated with the device-to-host data transfer into a device-to-host block of memory at the determined device-to-host memory address via the host interface; and
   incrementing the device-to-host write pointer by a value corresponding to a length of the device-to-host data.

10. The integrated circuit device of claim 9, wherein the host-to-device read pointer and the device-to-host write pointer are incremented in steps corresponding to a data transfer bus width.

11. The integrated circuit device of claim 9, wherein the device-to-host data mover is further configured to provide, to the host system, write-back metadata having information associated with the device-to-host data transfer.

12. The integrated circuit device of claim 11, wherein the write-back metadata includes a length field indicating the length of the device-to-host data.

13. The integrated circuit device of claim 9, further comprising a device-to-host data buffer configured to buffer the device-to-host data.

14. The integrated circuit device of claim 13, wherein the device-to-host data transfer is initiated when the device-to-host data buffer reaches a threshold amount of data.

15. The integrated circuit device of claim 13, wherein the device-to-host data transfer is initiated when data stored in the device-to-host data buffer includes an end-of-packet.

16. The integrated circuit device of claim 9, wherein the host-to-device block of memory and the device-to-host block of memory are allocated by a device driver in the host system.

17. The integrated circuit device of claim 5, wherein the host-to-device block of memory is a continuous block of memory.

18. The integrated circuit device of claim 5, wherein host-to-device block of memory includes non-contiguous memory portions.

19. A method of performing data transfers comprising:
allocating, by a host system, a host-to-device block of memory for host-to-device data transfers;
initializing, by the host system, a host-to-device write pointer to point to a starting address of the host-to-device block of memory;
determining, by the host system, a host-to-device memory address based on the host-to-device write pointer;
writing, by the host system, host-to-device data into the host-to-device block of memory at the determined host-to-device memory address; and
providing, by the host system, an address-less memory descriptor that does not include a memory address and contains a length of the host-to-device data to an integrated circuit device to indicate to the integrated circuit device that the host-to-device data is available.

20. The method of claim 19, further comprising:
incrementing the host-to-device write pointer by a value corresponding to the length of the host-to-device data.

21. The method of claim 19, further comprising:
receiving write-back metadata associated with a device-to-host data transfer from the integrated circuit device indicating a length of device-to-host data associated with the device-to-host data transfer.

22. The method of claim 21, further comprising:
determining a device-to-host memory address based on a device-to-host read pointer;
reading the device-to-host data from a device-to-host block of memory at the determined device-to-host memory address; and
incrementing the device-to-host read pointer by a value corresponding to the length of the device-to-host data.

23. The method of claim 22, wherein the host-to-device write pointer and the device-to-host read pointer are incremented in steps corresponding to a data transfer bus width.

24. The method of claim 22, further comprising:
initializing the host-to-device write pointer to point to a starting address of the host-to-device block of memory; and
initializing the device-to-host read pointer to point to a starting address of the device-to-host block of memory.

25. The method of claim 22, wherein the host-to-device write pointer rolls over at a value corresponding to a size of the host-to-device block of memory, and the device-to-host read pointer rolls over at a value corresponding to a size of the device-to-host block of memory.

26. A non-transitory computer readable medium having stored therein computer readable code that, when executed by one or more processors, causes the one or more processors to execute a device driver, the device driver performing operations including:
allocating a host-to-device block of memory for host-to-device data transfers;
initializing a host-to-device write pointer to point to a starting address of the host-to-device block of memory;
determining a host-to-device memory address based on the host-to-device write pointer;
writing host-to-device data into the host-to-device block of memory at the determined host-to-device memory address; and
providing an address-less memory descriptor that does not include a memory address and contains a length of the host-to-device data to an integrated circuit device to indicate to the integrated circuit device that the host-to-device data is available.

\* \* \* \* \*